(12) United States Patent
Higuchi et al.

(10) Patent No.: US 11,964,517 B2
(45) Date of Patent: Apr. 23, 2024

(54) PNEUMATIC TIRE

(71) Applicant: Sumitomo Rubber Industries, Ltd., Hyogo (JP)

(72) Inventors: Keiji Higuchi, Kobe (JP); Kenji Kodama, Kobe (JP); Kazuma Ujigawa, Kobe (JP); Kiyotaka Ueyama, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 775 days.

(21) Appl. No.: 16/503,856

(22) Filed: Jul. 5, 2019

(65) Prior Publication Data
US 2020/0016941 A1    Jan. 16, 2020

(30) Foreign Application Priority Data
Jul. 12, 2018  (JP) ................................. 2018-132269

(51) Int. Cl.
  *B60C 15/024*  (2006.01)
  *B60C 15/00*  (2006.01)
  (Continued)

(52) U.S. Cl.
  CPC ........ *B60C 15/0072* (2013.01); *B60C 15/024* (2013.01); *B60C 15/0242* (2013.01);
  (Continued)

(58) Field of Classification Search
  CPC ... B60C 15/024; B60C 15/0242; B60C 15/06; B60C 15/0603; B60C 17/0009
  See application file for complete search history.

(56) References Cited

U.S. PATENT DOCUMENTS

| 5,033,524 A | * | 7/1991 | Ohtsuka | ................. | B60C 15/06 |
| | | | | | 152/542 |
| 2006/0096686 A1 | * | 5/2006 | Hayashi | ................. | B60C 15/06 |
| | | | | | 152/454 |

(Continued)

FOREIGN PATENT DOCUMENTS

| EP | 2 072 289 A1 | 6/2009 | | |
| EP | 2072289 A1 | * | 6/2009 | ............... C08L 9/00 |

(Continued)

OTHER PUBLICATIONS

Yamashiro, JP-2015174526-A; Machine Translation (Year: 2015).*

(Continued)

*Primary Examiner* — Adrienne C. Johnstone
(74) *Attorney, Agent, or Firm* — Studebaker & Brackett PC (57) ABSTRACT

A tire 12 includes: a tread surface 34; seat contact surfaces 58 each to be in contact with a seat S of a rim R; and side surfaces 60 extending on and between the tread surface 34 and the seat contact surfaces 58. Each side surface 60 includes a flange contact surface 62 to be in contact with a flange F of the rim R, and a flange opposed surface 64 which is located radially outward of the flange contact surface 62 and is to be opposed to the flange F. The flange opposed surface 64 is formed to be a surface having a diameter increasing outward in an axial direction. A shape of the flange opposed surface 64 is represented by a circular arc, and a radius of the circular arc is not less than 11.0 mm and not greater than 20.0 mm.

12 Claims, 5 Drawing Sheets

(51) Int. Cl.
*B60C 15/06* (2006.01)
*B60C 17/00* (2006.01)

(52) U.S. Cl.
CPC .......... *B60C 15/06* (2013.01); *B60C 15/0603* (2013.01); *B60C 17/0009* (2013.01)

(56) References Cited

U.S. PATENT DOCUMENTS

| | | | |
|---|---|---|---|
| 2013/0270892 A1 | 10/2013 | Nakayama | |
| 2014/0209228 A1* | 7/2014 | Kuwayama | B60C 15/04 152/454 |
| 2016/0001608 A1 | 1/2016 | Abdallah, Jr. et al. | |
| 2017/0225522 A1* | 8/2017 | Tomita | B60C 15/0242 |

FOREIGN PATENT DOCUMENTS

| | | | | |
|---|---|---|---|---|
| EP | 3 315 327 A1 | | 5/2018 | |
| EP | 3 505 371 A1 | | 7/2019 | |
| JP | H11-157311 A | | 6/1999 | |
| JP | 2005238916 A | * | 9/2005 | |
| JP | 2005247007 A | * | 9/2005 | |
| JP | 2011073464 A | * | 4/2011 | |
| JP | 2015174526 A | * | 10/2015 | .......... B60C 15/024 |
| JP | 2015-199473 A | | 11/2015 | |
| WO | 2019/115055 A1 | | 6/2019 | |

OTHER PUBLICATIONS

"Understanding Wheel and Rim Terminology", Apr. 9, 2016. https://web.archive.org/web/20160409085929/http://p101tv.com/article_view.php?article=36 (Year: 2016).*
English machine translation of JP 2005-247007 A, Sep. 15, 2005.*
English machine translation of JP 2005-238916 A, Sep. 8, 2005.*
The extended European search report issued by the European Patent Office on Nov. 25, 2019, which corresponds to European Patent Application No. 19185307.6-1012 and is related to U.S. Appl. No. 16/503,856.

* cited by examiner

PNEUMATIC TIRE

The present application is based upon and claims the benefit of priority to Japanese Patent Application No. 2018-132269, filed Jul. 12, 2018, the entire contents of which are incorporated herein by reference.

BACKGROUND OF THE INVENTION

Field of the Invention

The present invention relates to pneumatic tires. More specifically, the present invention relates to side-reinforcing type run flat tires.

Description of the Related Art

A pneumatic tire as a run flat tire has side reinforcing layers formed inward of sidewalls. The side reinforcing layers are formed from a crosslinked rubber. In a state where the internal pressure is reduced due to puncture, i.e., in a punctured state, the side reinforcing layers support a load.

When a tire passes on a stepped portion such as a pothole in a road surface, a high impact force acts on the tire. The tire is pressed between the road surface and a flange of a rim, and a portion of the tire from the sidewall to a clinch is greatly deformed. A high tensile force acts on cords included in a carcass, and, depending on the degree of the tensile force, the cords may be broken. Such damage accompanied with breakage of the cords is called pinch cut.

Figure 5:
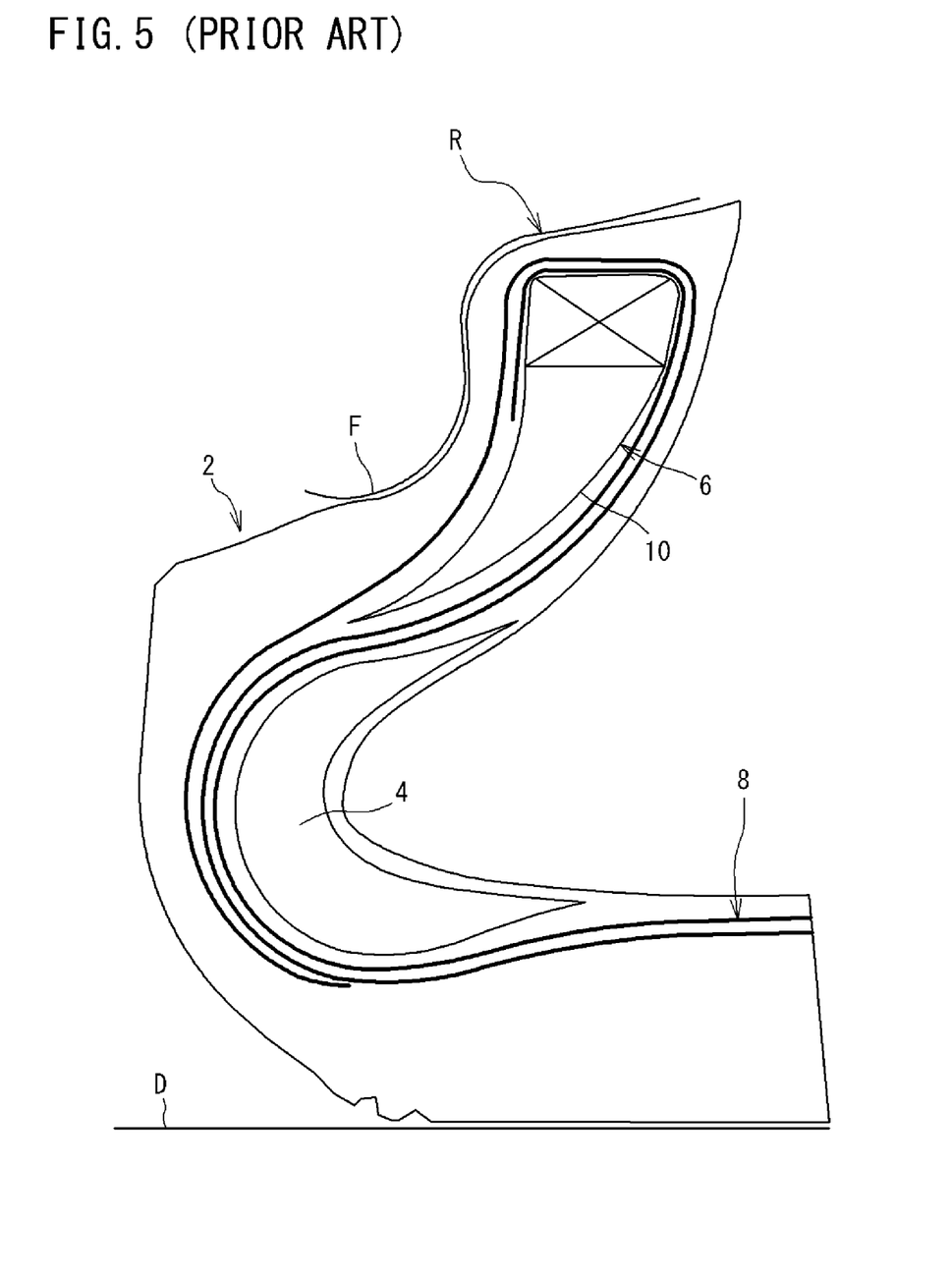
FIG. 5 illustrates occurrence of pinch cut.

FIG. 5 shows a tire 2 in a deformed state in the case of the tire 2 being pressed between a road surface D and a flange F of a rim R. As shown in FIG. 5, a carcass 8 is curved at a side reinforcing layer 4 portion and a bead 6 portion. At the side reinforcing layer 4 portion, the carcass 8 has a shape projecting outward, and, at the bead 6 portion, the carcass 8 has a shape projecting inward.

By analysis using a finite element method (FEM), it has been confirmed that, in the case of a run flat tire, a high tensile force acts on the carcass 8 (more specifically, cords included in the carcass 8) extending along an inner surface 10 of the bead 6. That is, in the case of a run flat tire, there is a possibility that pinch cut may occur in the carcass 8 extending along the inner surface 10 of the bead 6.

In order to prevent occurrence of pinch cut in a run flat tire, studies are made for controlling the stiffness of an apex portion to reduce a tensile force acting on the cords (for example, Japanese Laid-Open Patent Publication No. 2015-199473).

In Japanese Laid-Open Patent Publication No. 2015-199473, in order to prevent occurrence of pinch cut, a filler is provided between a side reinforcing layer and a carcass in a portion axially inward of the apex, thereby reducing a tensile force acting on the cords.

In order to prevent occurrence of pinch cut, in addition to a filler being provided as in Japanese Laid-Open Patent Publication No. 2015-199473, various methods are considered, e.g., employment of cords having a high modulus, increase in the number of carcass plies of the carcass, and thickening of a rubber member.

However, in each of the above methods, the stiffness is increased, and thus ride comfort may be degraded. Also, due to increase in the weight, the rolling resistance may be increased. Furthermore, such approaches in which the stiffness is increased have not successfully provided great effects as expected.

Durability during running in a punctured state, i.e., run-flat running, has been improved, so that it is possible to run over a sufficient distance with the tire in a punctured state. Accordingly, it is required to establish technology that can prevent occurrence of pinch cut while inhibiting deterioration in ride comfort and increase in the weight, on the premise that necessary durability is ensured though durability in run-flat running is sacrificed to a certain extent.

The present invention has been made in view of the above circumstances, and an object of the present invention is to provide a pneumatic tire that enables inhibition of occurrence of pinch cut.

SUMMARY OF THE INVENTION

As a result of a thorough study on technology for inhibiting occurrence of pinch cut, the present inventors have found that, in a state where a tire is mounted on a rim, when a distance is ensured between the tire and a flange of the rim and the bead portion is readily bent, tensile force acts on the entire carcass and stress concentrating on the apex portion is reduced, leading to completion of the present invention.

A pneumatic tire according to the present invention includes: a pair of beads each including a core extending in a circumferential direction; a carcass extending on and between one of the beads and the other of the beads; and a pair of side reinforcing layers each located axially inward of the carcass. The tire has an outer surface including a tread surface configured to be in contact with a road surface, seat contact surfaces each of which is configured to be in contact with a seat of a rim on which the tire is to be mounted, and side surfaces extending on and between the tread surface and the seat contact surfaces. Each side surface includes a flange contact surface which is to be in contact with a flange of the rim when the tire is mounted on the rim, and a flange opposed surface which is located radially outward of the flange contact surface and is to be opposed to the flange. The flange opposed surface is formed to be a surface having a diameter increasing outward in an axial direction. A shape of the flange opposed surface is represented by a circular arc in a cross-section of the tire as taken along a plane including a rotation axis of the tire, and a radius of the circular arc is not less than 11.0 mm and not greater than 20.0 mm More preferably, in the pneumatic tire, the radius of the circular arc is not less than 12.0 mm and not greater than 18.0 mm.

Preferably, the pneumatic tire further includes rim guards which are located radially outward of the rim in a state where the tire is mounted on the rim, and project outward in the axial direction. Each rim guard has a shape expanding from a top portion thereof so as to be tapered in the cross-section of the tire, and a surface, on a bead side, of the rim guard forms the flange opposed surface.

Preferably, in the pneumatic tire, a distance in a radial direction from a bead base line to an inner end of the flange opposed surface is not less than 11.0 mm and not greater than 20.0 mm More preferably, in the pneumatic tire, a distance in the radial direction from the bead base line to the inner end of the flange opposed surface is not less than 12.0 mm and not greater than 18.0 mm.

Preferably, in the pneumatic tire, in a state where the tire is mounted on the rim, an interval between the flange opposed surface and the flange is not less than 2.6 mm and not greater than 6.0 mm, the interval being measured along a line that is normal to the flange opposed surface and passes through a position, on the flange, corresponding to 90% of a distance in a radial direction from a bead base line to a radially outer end of the flange of the rim.

Preferably, the pneumatic tire further includes: a tread having the tread surface; a pair of sidewalls extending radially inward from ends of the tread along the carcass, on an axially outer side of the carcass; and a pair of clinches located radially inward of the sidewalls, and each rim guard is formed by a part of a corresponding one of the sidewalls and a part of a corresponding one of the clinches.

Preferably, in the pneumatic tire, each clinch includes: an inner clinch which is located between the flange and the carcass in a state where the tire is mounted on the rim; and an outer clinch which is located radially outward of the inner clinch. A ratio of a complex elastic modulus of the outer clinch relative to a complex elastic modulus of the inner clinch is not less than 0.5 and not greater than 0.9.

Preferably, in the pneumatic tire, a distance in a radial direction from a bead base line to a radially outer end of the inner clinch is not less than 12.0 mm and not greater than 15.0 mm.

Preferably, in the pneumatic tire, in the cross-section of the tire, a boundary between the inner clinch and the outer clinch extends in the axial direction, or is tilted relative to the axial direction such that an inner end of the boundary is located radially inward of an outer end of the boundary. An angle of the boundary relative to the axial direction is not greater than 30°.

Preferably, in the pneumatic tire, each bead includes an apex located radially outward of the core. In the cross-section of the tire, a width of a contact surface of the apex with the core is not less than 7.0 mm and not greater than 9.0 mm A width of the apex at a position distant from a bead base line by 17.5 mm in a radially outward direction is not less than 4.5 mm and not greater than 6.0 mm.

Preferably, in the pneumatic tire, the carcass includes a first carcass ply and a second carcass ply located outward of the first carcass ply. Each of the first carcass ply and the second carcass ply is turned up around each core from an inner side toward an outer side in the axial direction. Ends of the second carcass ply are located radially inward of ends of the first carcass ply. A distance in a radial direction from a bead base line to each end of the first carcass ply is not less than 40% of a cross-sectional height and not greater than 80% of the cross-sectional height.

According to the present invention, a pneumatic tire that enables inhibition of occurrence of pinch cut is obtained.

DETAILED DESCRIPTION OF THE EMBODIMENTS

The following will describe in detail the present invention based on preferred embodiments with appropriate reference to the drawings.

In the present invention, a state where a tire is mounted on a normal rim, the internal pressure of the tire is adjusted to a normal internal pressure, and no load is applied to the tire, is referred to as normal state. In the present invention, unless otherwise specified, the dimensions and angles of the tire and each member of the tire are measured in the normal state.

In the present specification, the normal rim means a rim specified in a standard on which the tire is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 12 is designed for a passenger car, unless otherwise specified, the normal internal pressure is 180 kPa.

In the present specification, a normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
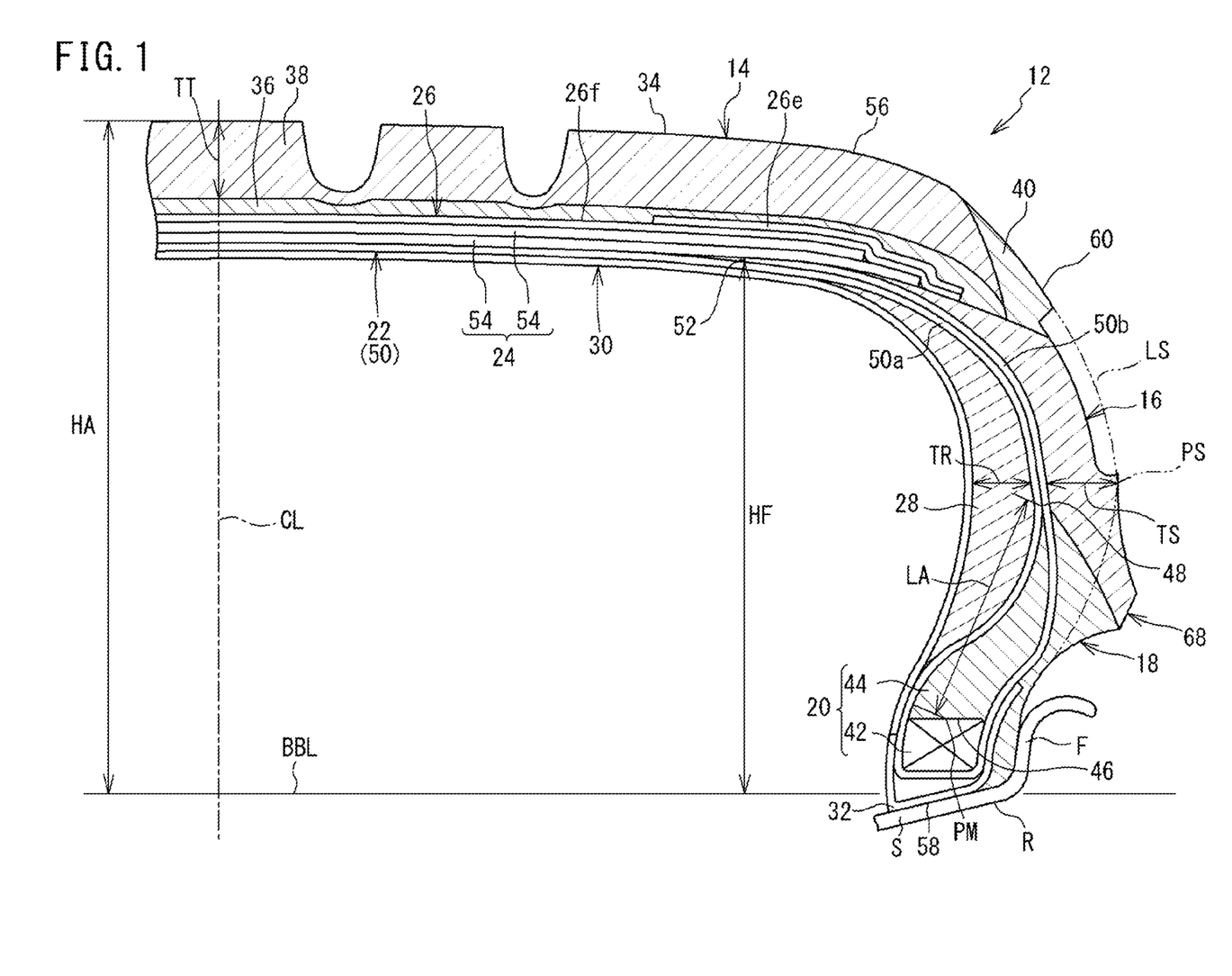
FIG. 1 is a cross-sectional view of a part of a pneumatic tire according to an embodiment of the present invention.

FIG. 1 shows a part of a pneumatic tire 12 according to an embodiment of the present invention. The tire 12 is mounted to a passenger car.

FIG. 1 shows a part of a cross-section of the tire 12 along a plane including the rotation axis of the tire 12. In FIG. 1, the right-left direction is the axial direction of the tire 12, and the up-down direction is the radial direction of the tire 12. The direction perpendicular to the surface of the sheet of FIG. 1 is the circumferential direction of the tire 12. In FIG. 1, an alternate long and short dash line CL represents the equator plane of the tire 12.

In FIG. 1, the tire 12 is mounted on a rim R. The rim R is a normal rim. The interior of the tire 12 is filled with air, and the internal pressure of the tire 12 is adjusted to a normal internal pressure. No load is applied to the tire 12.

In FIG. 1, a solid line BBL extending in the axial direction is a bead base line. The bead base line BBL is a line that defines the rim diameter (see JATMA or the like) of the rim R (normal rim).

The tire 12 includes a tread 14, a pair of sidewalls 16, a pair of clinches 18, a pair of beads 20, a carcass 22, a belt 24, a band 26, a pair of side reinforcing layers 28, an inner liner 30, and a pair of chafers 32.

The outer surface of the tread 14 comes into contact with a road surface. The tread 14 has a tread surface 34 to be in contact with the road surface. In the tire 12, the tread 14 includes a base portion 36 and a cap portion 38 located radially outward of the base portion 36. In the tire 12, the cap portion 38 includes the tread surface 34. In the tire 12, the base portion 36 is formed from a crosslinked rubber for which adhesion is taken into consideration. The cap portion 38 is formed from a crosslinked rubber for which abrasion resistance and grip performance are taken into consideration.

In FIG. 1, a double-headed arrow TT represents the thickness of the tread 14 on the equator plane CL. In the tire 12, the thickness TT of the tread 14 is not less than 5 mm and not greater than 15 mm.

Each sidewall 16 is located axially outward of the carcass 22. The sidewall 16 extends radially inward from the end of the tread 14 along the carcass 22. In the tire 12, the sidewall 16 is formed from a crosslinked rubber for which cut resistance is taken into consideration. In the tire 12, a wing 40 is disposed between the sidewall 16 and the tread 14.

In FIG. 1, an alternate long and two short dashes line LS represents a virtual outer surface of the tire 12 obtained on the assumption that decorations such as dimples or projections are not formed. Reference character PS represents a position which is specified on the basis of the virtual outer surface and at which the tire 12 has the maximum width in the axial direction. A double-headed arrow TS represents the width (thickness), in the axial direction, of the sidewall 16 at the position PS. In the tire 12, the width TS in the axial direction is not less than 2 mm and not greater than 9 mm.

Each clinch 18 is located radially inward of the sidewall 16. As shown in FIG. 1, at least a part of the clinch 18 comes into contact with a flange F of the rim R. Each clinch 18 forms a flange contact surface and a flange opposed surface.

The clinch 18 is formed from a crosslinked rubber. In the tire 12, the clinch 18 is obtained by vulcanizing a single rubber composition. In the tire 12, a complex elastic modulus $E^*c$ of the clinch 18 is not less than 30 MPa and not greater than 60 MPa.

In the present invention, the complex elastic modulus $E^*c$ of the clinch 18 is measured according to the standards of JIS-K 6394 using a viscoelasticity spectrometer under the following conditions.

Initial strain: 10%
Amplitude: ±2%
Frequency: 10 Hz
Deformation mode: tension
Measurement temperature: 70° C.

Each bead 20 is located axially inward of the clinch 18. Each bead 20 includes a core 42 and an apex 44 located radially outward of the core 42. The core 42 extends in the circumferential direction. As shown in FIG. 1, the core 42 has a rectangular cross-sectional shape. The apex 44 extends radially outward from the core 42. In the cross-section of the tire 12 shown in FIG. 1, the apex 44 is tapered outward in the radial direction.

In FIG. 1, reference character PM represents the center of the width, in the axial direction, of a contact surface 46 of the apex 44 with the core 42. A double-headed arrow LA represents the shortest distance between the width center PM and an outer end 48 of the apex 44. In the tire 12, the shortest distance LA, i.e., the length LA of the apex 44, is not less than 25 mm and not greater than 50 mm.

In the tire 12, the apex 44 is formed from a crosslinked rubber. In the tire 12, the complex elastic modulus $E^*a$ of the apex 44 is not less than 50 MPa and not greater than 100 MPa. The apex 44 has high stiffness. The complex elastic modulus $E^*a$ of the apex 44 is measured in the same manner as the complex elastic modulus $E^*c$ of the clinch 18 described above.

The carcass 22 is located inward of the tread 14, the sidewalls 16, and the clinches 18. The carcass 22 extends on and between one bead 20 and the other bead 20. The carcass 22 includes at least one carcass ply 50. In the tire 12, the carcass 22 is formed from one carcass ply 50.

The carcass ply 50 includes multiple carcass cords aligned with each other, which are not shown. The carcass cords are covered with a topping rubber. Each carcass cord intersects the equator plane CL. In the tire 12, the angle of each carcass cord relative to the equator plane CL is not less than 70° and not greater than 90°. The carcass 22 of the tire 12 has a radial structure. In the tire 12, a cord formed from an organic fiber is used as the carcass cord.

In the tire 12, the carcass ply 50 is turned up around each core 42. The carcass ply 50 includes: a main body portion 50a that extends on and between one core 42 and the other core 42; and a pair of turned-up portions 50b that are connected to the main body portion 50a and turned up around the respective cores 42 from the inner side toward the outer side in the axial direction. As shown in FIG. 1, in the tire 12, an end 52 of each turned-up portion 50b is located between the main body portion 50a and the belt 24.

The belt 24 is layered over the carcass 22 in a portion radially inward of the tread 14. In the tire 12, the belt 24 includes two belt plies 54.

Each belt ply 54 includes multiple belt cords aligned with each other, which are not shown. The belt cords are covered with a topping rubber. Each belt cord is tilted relative to the equator plane CL. The angle of each belt cord relative to the equator plane CL is not less than 10° and not greater than 35°. In the tire 12, the material of the belt cords is steel.

The band 26 is located between the tread 14 and the belt 24 in the radial direction. In the tire 12, the band 26 includes a full band 26f and a pair of edge bands 26e.

The full band 26f covers the entirety of the belt 24. The full band 26f has a jointless structure. The full band 26f includes a helically wound full band cord, which is not shown. A cord formed from an organic fiber is used as the full band cord.

Each edge band 26e covers an end portion of the belt 24, from the outer side of the full band 26f in the radial direction. The edge band 26e has a jointless structure. The edge band 26e includes a helically wound edge band cord, which is not shown. A cord formed from an organic fiber is used as the edge band cord.

The side reinforcing layer 28 is located axially inward of the sidewall 16. Further, the side reinforcing layer 28 is located axially inward of the carcass 22. As shown in FIG. 1, the side reinforcing layer 28 has a crescent-like cross-sectional shape.

The side reinforcing layer 28 is formed from a crosslinked rubber. In a state where the internal pressure is reduced due to puncture, i.e., in a punctured state, the side reinforcing layer 28 supports a load. Therefore, a vehicle to which the tire 12 is mounted can run over a certain distance in a punctured state. The tire 12 is a side-reinforcing type run flat tire.

In the tire 12, from the standpoint of supporting a load, the complex elastic modulus $E^*r$ of the side reinforcing layer 28 is preferably not less than 9 MPa. From the standpoint of ride comfort, the complex elastic modulus $E^*r$ of the side reinforcing layer 28 is preferably not greater than 14 MPa. The complex elastic modulus $E^*r$ of the side reinforcing layer 28 is measured in the same manner as the complex elastic modulus $E^*c$ of the clinch 18 described above.

In FIG. 1, a double-headed arrow TR represents the width (thickness), in the axial direction, of the side reinforcing layer 28 at the position PS where the tire 12 has the maximum width in the axial direction. In the tire 12, the width TR in the axial direction is not less than 3 mm and not greater than 15 mm.

The inner liner 30 is located inward of the carcass 22 and the side reinforcing layer 28. The inner liner 30 forms the inner surface of the tire 12. The inner liner 30 is formed from a crosslinked rubber that has an excellent air blocking property. The inner liner 30 maintains the internal pressure of the tire 12.

Each chafer 32 is located radially inward of the bead 20. As shown in FIG. 1, at least a part of the chafer 32 comes into contact with a seat S of the rim R. In the tire 12, the chafer 32 includes a fabric and a rubber with which the fabric is impregnated.

In the tire 12, the tread 14, the sidewalls 16, the clinches 18, and the chafers 32 form an outer surface 56 of the tire 12. Of the outer surface 56, a portion to be in contact with a road surface is the tread surface 34, a portion to be in contact with the seat S of the rim R is a seat contact surface 58, and a portion between the tread surface 34 and the seat contact surface 58 is a side surface 60. The outer surface 56 includes the tread surface 34, the seat contact surfaces 58, and the side surfaces 60 extending on and between the tread surface 34 and the seat contact surfaces 58.

Figure 2:
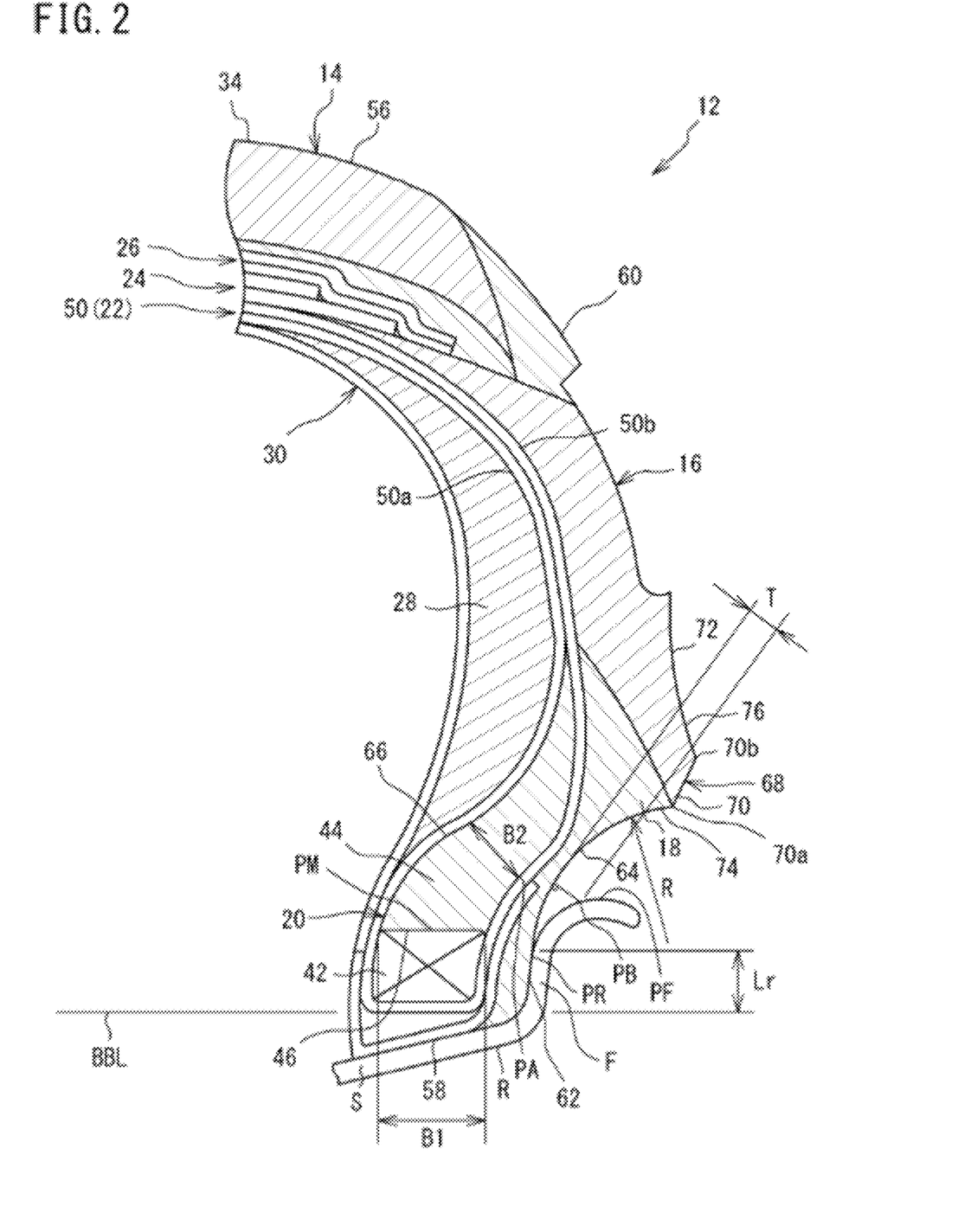
FIG. 2 is a cross-sectional view of a part of the tire in FIG. 1.

FIG. 2 shows a part of the cross-section of the tire 12 shown in FIG. 1. In FIG. 2, a portion of the tire 12 from the sidewall 16 to the bead 20 is shown. In FIG. 2, the right-left direction is the axial direction of the tire 12, and the up-down direction is the radial direction of the tire 12. The direction perpendicular to the surface of the sheet of FIG. 2 is the circumferential direction of the tire 12.

As described above, the tire 12 is mounted on the rim R. Thus, as shown in FIG. 2, the seat contact surface 58 comes into contact with the seat S of the rim R. Further, a part of the side surface 60 comes into contact with the flange F of the rim R. In the tire 12, a portion, of the side surface 60, which comes into contact with the flange F when the tire 12 is mounted on the rim R is a flange contact surface 62.

In the tire 12, a portion, of the side surface 60, which is located radially outward of the flange contact surface 62 is opposed to the flange F but is not in contact with the flange F, in the normal state. In the tire 12, the portion that is located radially outward of the flange contact surface 62 and that is opposed to the flange F but is not in contact with the flange F in the normal state, is a flange opposed surface 64. That is, the side surface 60 includes the flange contact surface 62, and the flange opposed surface 64 located radially outward of the flange contact surface 62 and opposed to the flange F.

As shown in FIG. 2, the flange opposed surface 64 is formed to be a surface having a diameter increasing outward in the axial direction along the entire axial extent of the flange opposed surface 64. In particular, the shape of the flange opposed surface 64 is represented by a circular arc on the cross-section of the tire 12 as taken along a plane including the rotation axis of the tire 12. In FIG. 2, an arrow denoted by reference character R represents the radius of the circular arc. In the tire 12, the radius R of the circular arc is not less than 11.0 mm and not greater than 20.0 mm.

In FIG. 2, reference character PF represents a radially outer end of the flange F. Reference character PB represents a position, on the flange F, which corresponds to 90% of the distance in the radial direction from the bead base line BBL to the outer end PF. A double-headed arrow T represents the interval between the flange opposed surface 64 and the flange F. The interval T is measured along a line that passes through the position PB on the flange F and is normal to the flange opposed surface 64.

In a state where the tire 12 is mounted on the rim R, more specifically, in the normal state, the interval T between the tire 12 and the flange F of the rim R is sufficiently ensured, as shown in FIG. 2. More specifically, the interval T in the conventional tire is 2.3 mm, whereas the interval T in the tire 12 is not less than 2.6 mm and not greater than 6.0 mm. In the tire 12, since the interval T between the tire 12 and the flange F of the rim R is sufficiently ensured, the bead 20 portion is readily bent in its entirety. At the time of passing on a stepped portion, in a case where a portion of the tire 12 from the sidewall 16 to the clinch 18 is greatly deformed by being pressed between the road surface and the flange F of the rim R, tensile force acts on the entirety of the carcass 22. In the conventional tire, there is a possibility that pinch cut may occur in the carcass extending along an inner surface of the bead. In contrast, in the tire 12, stress acting on the carcass 22 is reduced. In the tire 12, occurrence of pinch cut is inhibited.

In the tire 12, addition of a filler or the like as in the conventional tire is not needed in order to inhibit occurrence of pinch cut. In the tire 12, increase in the weight is inhibited. In addition, since the stiffness of the bead 20 portion is appropriately maintained, reduction in ride comfort is inhibited.

As described above, in the tire 12, the interval T between the tire 12 and the flange F of the rim R is sufficiently ensured. Therefore, in the tire 12, the volume of the bead 20 portion is smaller as compared to the conventional tire in which the interval T is small. In the tire 12, the side surface 60 including the flange opposed surface 64 contributes to weight reduction of the tire 12.

In the tire 12, the bead 20 portion is readily bent in its entirety. Therefore, it cannot be denied that durability during running in a punctured state, i.e., run-flat running, may be reduced. However, the side surface 60 is formed such that the flange opposed surface 64 has a predetermined radius R, and the stiffness of the bead 20 portion is appropriately maintained. Therefore, necessary durability is ensured though durability in run-flat running is sacrificed to a certain extent. In the tire 12, occurrence of pinch cut is inhibited while necessary run-flat durability is ensured.

As described above, in the tire 12, the radius R of the circular arc representing the shape of the flange opposed surface 64 is not less than 11.0 mm and not greater than 20.0 mm From the standpoint that the interval T between the flange opposed surface 64 and the flange F is more sufficiently ensured and occurrence of pinch cut is effectively inhibited, the radius R is preferably not less than 12.0 mm From the standpoint that the stiffness is appropriately maintained and necessary run-flat durability is ensured, the radius R is preferably not greater than 18.0 mm.

The tire 12 includes rim guards 68 projecting axially outward. As shown in FIG. 1, each rim guard 68 is formed by a part of the sidewall 16 and a part of the clinch 18. In the tire 12, the rim guard 68 may be formed by only a part of the sidewall 16. The rim guard 68 may be formed by only a part of the clinch 18.

The rim guard 68 is located radially outward of the rim R in a state where the tire 12 is mounted on the rim R, more specifically, in the normal state. Although not shown, the rim guard 68 continuously extends in the circumferential direction.

The rim guard 68 prevents damage to the flange F of the rim R on which the tire 12 is mounted. As shown in FIG. 2, in the cross-section of the tire 12, the rim guard 68 has a shape that expands inward from a top portion 70 so as to be tapered. From the standpoint of prevention of damage to the flange F, the rim guard 68 is preferably formed such that the top portion 70 of the rim guard 68 is located axially outward of the flange F in the normal state.

In the tire 12, an outer surface 72 of the rim guard 68 has a surface 74, on the bead 20 side, which extends radially inward from an inner end 70*a* of the top portion 70, and a surface 76, on the tread 14 side, which extends radially outward from an outer end 70*b* of the top portion 70. In the tire 12, the outer surface 72 of the rim guard 68 is a part of the side surface 60, and the surface 74, on the bead 20 side, of the outer surface 72 of the rim guard 68 is the flange opposed surface 64.

In the tire 12, the rim guard 68 portion has a greater volume as compared to the other portions. Therefore, in the tire 12, the rim guard 68 portion has high stiffness. However, the tire 12 is formed such that the surface 74, on the bead 20 side, of the outer surface 72 of the rim guard 68 is the flange opposed surface 64, and, thus, the interval T between the tire 12 and the flange F of the rim R is sufficiently ensured in the normal state. In the tire 12, the bead 20 portion is readily bent in its entirety though the rim guard 68 is provided. In the tire 12, at the time of passing on a stepped portion, even when the portion of the tire 12 from the sidewall 16 to the clinch 18 is greatly deformed by being pressed between a road surface and the flange F of the rim R, stress acting on the carcass 22 extending along the inner surface 66 of the bead 20 is reduced. In the tire 12, occurrence of pinch cut is inhibited.

From this standpoint, in the case where the tire 12 includes the rim guard 68 located radially outward of the rim R and projecting axially outward in a state where the tire 12 is mounted on the rim R, and the rim guard 68 has a shape expanding from the top portion 70 so as to be tapered in the cross-section of the tire 12, the surface 74, on the bead 20 side, of the rim guard 68 is preferably the flange opposed surface 64 described above.

In the tire 12, the surface 76, on the tread 14 side, of the rim guard 68 is formed to be a surface having a diameter increasing inward in the axial direction from the outer end 70b of the top portion 70 of the rim guard 68. The tire 12 is formed such that the shape of the surface 76 on the tread 14 side is represented by a circular arc on the cross-section of the tire 12 as taken along a plane including the rotation axis thereof. In the tire 12, the size of the circular arc is determined as appropriate in consideration of the outer surface shape of a radially outer portion of the surface 76 on the tread 14 side.

In FIG. 2, reference character PR represents an inner end of the flange opposed surface 64. In the tire 12, the inner end PR corresponds to the boundary between the flange opposed surface 64 and the flange contact surface 62. In FIG. 2, a double-headed arrow Lr represents a distance in the radial direction from the bead base line BBL to the inner end PR of the flange opposed surface 64.

In the tire 12, the distance Lr in the radial direction from the bead base line BBL to the inner end PR of the flange opposed surface 64 is preferably not less than 11.0 mm, and preferably not greater than 20.0 mm. When the distance Lr is set to be not less than 11.0 mm, the interval T is ensured. In the tire 12, the bead 20 portion is readily bent in its entirety, so that concentration of stress on the carcass 22 extending along the inner surface 66 of the bead 20 is inhibited. In the tire 12, occurrence of pinch cut is inhibited. From this standpoint, the distance Lr is more preferably not less than 12.0 mm. When the distance Lr is set to be not greater than 20.0 mm, the stiffness is appropriately maintained, so that necessary run-flat durability is ensured. From this standpoint, the distance Lr is more preferably not greater than 18.0 mm.

In FIG. 2, a double-headed arrow B1 represents the width of the contact surface 46 of the apex 44 with the core 42. The width B1 is measured along a virtual line (not shown) passing through the width center PM and extending in the axial direction. In FIG. 2, reference character PA represents a specific position on an outer side surface of the apex 44, and the distance in the radial direction from the bead base line BBL to the position PA is 17.5 mm. In FIG. 2, a double-headed arrow B2 represents the width of the apex 44 at the position PA. That is, the width of the apex 44 represented by the double-headed arrow B2 is the width of the apex 44 at a position that is distant from the bead base line BBL by 17.5 mm in the radially outward direction. The width B2 of the apex 44 is measured along a line that passes through the position PA and is normal to the inner surface 66 of the bead 20 (more specifically, apex 44) in the cross-section shown in FIG. 2.

In the cross-section of the tire 12 shown in FIG. 2, the width B1 of the contact surface 46 of the apex 44 with the core 42 is preferably not less than 7.0 mm, and preferably not greater than 9.0 mm. When the width B1 of the contact surface 46 is set to be not less than 7.0 mm, the stiffness is appropriately maintained, so that necessary run-flat durability is ensured. When the width B1 of the contact surface 46 is set to be not greater than 9.0 mm, the bead 20 portion is readily bent in its entirety, so that concentration of stress on the carcass 22 extending along the inner surface 66 of the bead 20 is inhibited. In the tire 12, occurrence of pinch cut is inhibited.

In the cross-section of the tire 12 shown in FIG. 2, the width B2 of the apex 44 at the position that is distant from the bead base line BBL by 17.5 mm in the radially outward direction is preferably not less than 4.5 mm, and preferably not greater than 6.0 mm. In the tire 12, when the width B2 of the apex 44 is set to be not less than 4.5 mm, the stiffness is appropriately maintained, so that necessary run-flat durability is ensured. When the width B2 of the apex 44 is set to be not greater than 6.0 mm, the bead 20 portion is readily bent in its entirety, so that concentration of stress on the carcass 22 extending along the inner surface 66 of the bead 20 is inhibited. In the tire 12, occurrence of pinch cut is inhibited.

In FIG. 1, a double-headed arrow HA represents the distance in the radial direction from the bead base line BBL to the equator of the tire 12. The distance HA in the radial direction is the cross-sectional height (see JATMA or the like) of the tire 12. A double-headed arrow HF represents the distance in the radial direction from the bead base line BBL to the end 52 of the turned-up portion 50b of the carcass ply 50.

As described above, the carcass 22 of the tire 12 is formed from one carcass ply 50. In the tire 12, in the case where the carcass 22 is formed from one carcass ply 50, the ratio of the distance HF in the radial direction relative to the cross-sectional height HA is preferably not less than 40%, and more preferably not less than 50%, from the standpoint that the stiffness is maintained and necessary run-flat durability is ensured. From the standpoint of weight reduction of the tire 12, the ratio is preferably not greater than 85%.

As described above, in the tire 12 shown in FIG. 1, the end 52 of the turned-up portion 50b is located between the main body portion 50a and the belt 24. That is, in the tire 12, the carcass 22 is formed such that the end 52 of the turned-up portion 50b is disposed between the main body portion 50a and the belt 24. In the tire 12, the turned-up portion 50b, together with the side reinforcing layer 28, inhibits deformation of the tire 12 in a punctured state. The turned-up portion 50b contributes to support of a load in a punctured state. From this standpoint, in the case where the carcass 22 is formed from one carcass ply 50, the carcass 22 is preferably formed such that the end 52 of the turned-up portion 50b is disposed between the carcass 22 and the belt 24. In the tire 12, when the ratio of the distance HF in the radial direction relative to the cross-sectional height HA described above is not less than 80%, the carcass 22 is in such a state that the end 52 of the turned-up portion 50b is disposed between the carcass 22 and the belt 24.

Figure 3:
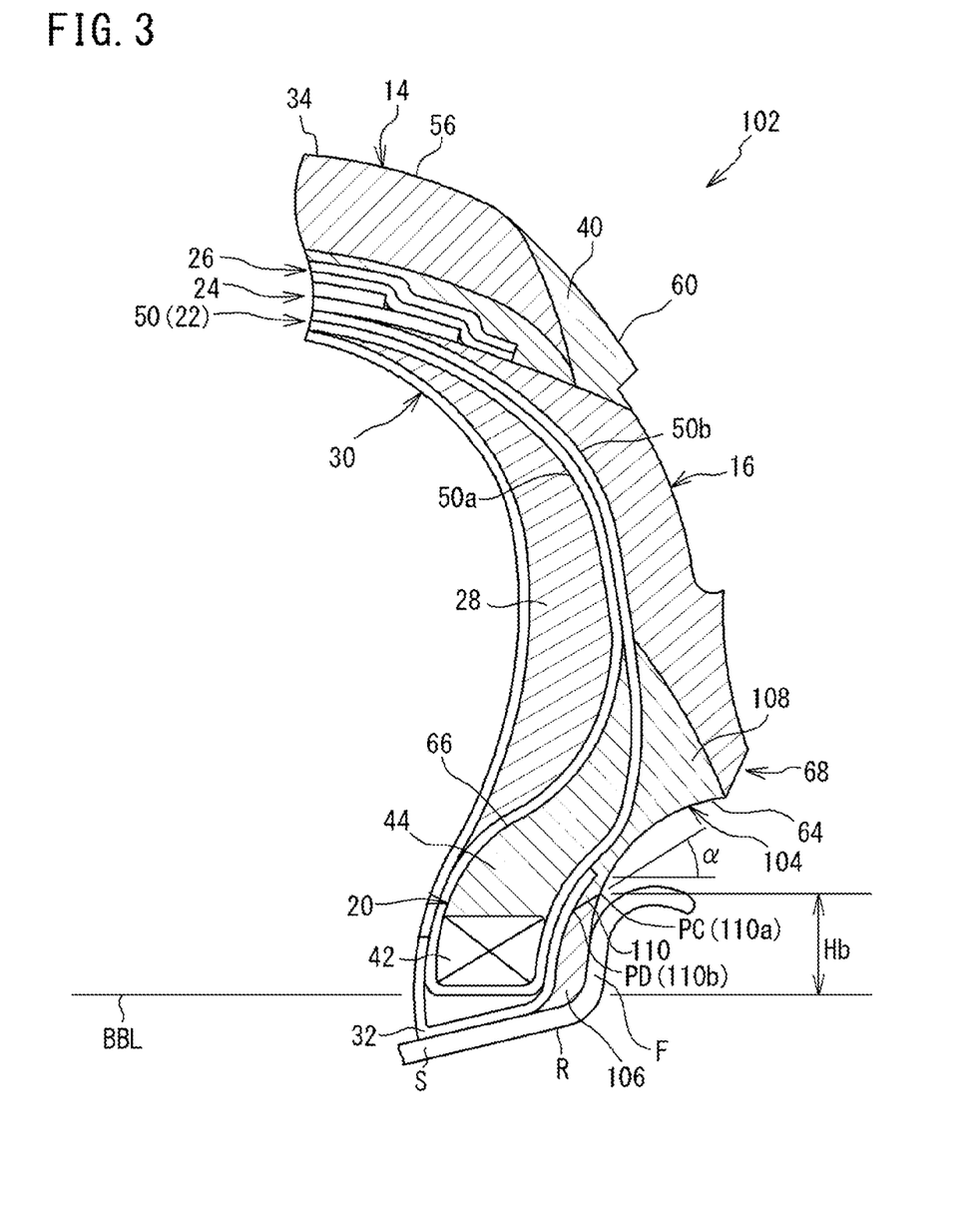
FIG. 3 is a cross-sectional view of a part of a pneumatic tire according to another embodiment of the present invention.

FIG. 3 shows a part of a pneumatic tire 102 according to another embodiment of the present invention. FIG. 3 shows a part of a cross-section of the tire 102 along a plane including the rotation axis of the tire 102. In FIG. 3, the right-left direction is the axial direction of the tire 102, and the up-down direction is the radial direction of the tire 102. The direction perpendicular to the surface of the sheet of FIG. 3 is the circumferential direction of the tire 102.

The tire 102 has the same structure as the structure of the tire 12 shown in FIG. 1, except for a clinch 104. Therefore, in FIG. 3, members that are the same as the members of the tire 12 in FIG. 1 are denoted by the same reference characters and the description thereof is omitted.

Also in the tire 102, similar to the tire 12 shown in FIG. 1, the side surface 60 has the flange opposed surface 64 opposed to the flange F of the rim R. The flange opposed surface 64 is formed to be a surface having a diameter increasing outward in the axial direction. In the cross-section of the tire 102 as taken along a plane including the rotation axis of the tire 102, the shape of the flange opposed surface 64 is represented by a circular arc, and the radius of the circular arc is not less than 11.0 mm and not greater than 20.0 mm.

In a state where the tire 102 is mounted on the rim R, the interval between the tire 102 and the flange F of the rim R is sufficiently ensured. In the tire 102, the bead 20 portion is readily bent in its entirety. At the time of passing on a stepped portion, when a portion of the tire 102 from the sidewall 16 to the clinch 104 is greatly deformed by being pressed between the road surface and the flange F of the rim R, tensile force acts on the entirety of the carcass 22. In the conventional tire, there is a possibility that pinch cut may occur in the carcass 22 extending along the inner surface 66 of the bead 20. In contrast, in the tire 102, stress acting on the carcass 22 is reduced. In the tire 102, occurrence of pinch cut is inhibited.

Further, in the tire 102, the clinch 104 includes an inner clinch 106 and an outer clinch 108. As shown in FIG. 3, the inner clinch 106 is located between the flange F and the carcass 22 in a state where the tire 102 is mounted on the rim R. The outer clinch 108 is located radially outward of the inner clinch 106.

In the tire 102, the inner clinch 106 and the outer clinch 108 are each formed from a crosslinked rubber. In particular, in the tire 102, a complex elastic modulus $E^*s$ of the outer clinch 108 is less than a complex elastic modulus $E^*u$ of the inner clinch 106. Specifically, the ratio of the complex elastic modulus $E^*s$ of the outer clinch 108 relative to the complex elastic modulus $E^*u$ of the inner clinch 106 is preferably not less than 0.5, and preferably not greater than 0.9. The complex elastic modulus $E^*u$ of the inner clinch 106 and the complex elastic modulus $E^*s$ of the outer clinch 108 are measured in the same manner as the complex elastic modulus $E^*c$ of the clinch 18 of the tire 12 shown in FIG. 1.

In the tire 102, when the ratio of the complex elastic modulus $E^*s$ of the outer clinch 108 relative to the complex elastic modulus $E^*u$ of the inner clinch 106 is set to be not less than 0.5, the stiffness is appropriately maintained and necessary run-flat durability is ensured. From this standpoint, the ratio is more preferably not less than 0.50.

In the tire 102, when the ratio of the complex elastic modulus $E^*s$ of the outer clinch 108 relative to the complex elastic modulus $E^*u$ of the inner clinch 106 is set to be not greater than 0.9, the bead 20 portion is readily bent in its entirety, so that concentration of stress on the carcass 22 extending along the inner surface 66 of the bead 20 is inhibited. In the tire 102, occurrence of pinch cut is inhibited. From this standpoint, the ratio is more preferably not greater than 0.90, and even more preferably not greater than 0.85.

In the tire 102, from the standpoint that necessary run-flat durability is ensured, and occurrence of pinch cut is effectively inhibited, preferably, the complex elastic modulus $E^*u$ of the inner clinch 106 is not less than 50 MPa and not greater than 60 MPa. In the tire 102, more preferably, the complex elastic modulus $E^*u$ of the inner clinch 106 is not less than 50 MPa and not greater than 60 MPa, and the ratio of the complex elastic modulus $E^*s$ of the outer clinch 108 relative to the complex elastic modulus $E^*u$ of the inner clinch 106 is not less than 0.5 and not greater than 0.9.

In FIG. 3, reference character PC represents a radially outer end of the inner clinch 106. A double-headed arrow Hb represents the distance in the radial direction from the bead base line BBL to the radially outer end PC of the inner clinch 106. In FIG. 3, reference character PD represents a radially inner end of the outer clinch 108. In the tire 102, the radially inner end PD of the outer clinch 108 is located radially inward of the radially outer end PC of the inner clinch 106.

In the tire 102, the distance Hb in the radial direction from the bead base line BBL to the radially outer end PC of the inner clinch 106 is preferably not less than 12.0 mm, and preferably not greater than 15.0 mm. When the distance Hb is set to be not less than 12.0 mm, the stiffness is appropriately maintained and necessary run-flat durability is ensured. When the distance Hb is set to be not greater than 15.0 mm, the bead 20 portion is readily bent in its entirety, so that concentration of stress on the carcass 22 extending along the inner surface 66 of the bead 20 is inhibited. In the tire 102, occurrence of pinch cut is inhibited.

As shown in FIG. 3, a boundary 110 between the inner clinch 106 and the outer clinch 108 is tilted relative to the axial direction, and an axially outer end 110a of the boundary 110 is located radially outward of an axially inner end 110b of the boundary 110. In the tire 102, the boundary 110 may be formed to extend in the axial direction. The boundary 110 may be formed such that the boundary 110 is tilted relative to the axial direction and the axially outer end 110a of the boundary 110 is located radially inward of the axially inner end 110b of the boundary 110. In the tire 102 shown in FIG. 3, the axially outer end 110a of the boundary 110 is the radially outer end PC of the inner clinch 106, and the axially inner end 110b of the boundary 110 is the radially inner end PD of the outer clinch 108.

In FIG. 3, reference character a represents the angle of the boundary 110 between the inner clinch 106 and the outer clinch 108 relative to the axial direction. The angle α is the tilt angle of the boundary 110. In the present invention, as shown in FIG. 3, in the case where the boundary 110 is tilted relative to the axial direction such that the axially inner end 110b of the boundary 110 is located radially inward of the axially outer end 110a thereof, the tilt angle α is represented as a positive value. In the case where the boundary 110 is tilted relative to the axial direction such that the axially inner end 110b of the boundary 110 is located radially outward of the axially outer end 110a thereof, the tilt angle α is represented as a negative value.

In the tire 102, from the standpoint that necessary run-flat durability is ensured and occurrence of pinch cut is effectively inhibited, in the cross-section of the tire 102 as taken along a plane including the rotation axis of the tire 102, the boundary 110 between the inner clinch 106 and the outer clinch 108 preferably extends in the axial direction, or the boundary 110 is preferably tilted relative to the axial direction such that the axially inner end 110b of the boundary 110 is located radially inward of the axially outer end 110a. Specifically, the tilt angle α of the boundary 110 is preferably not less than 0°, and preferably not greater than 30°.

Figure 4:
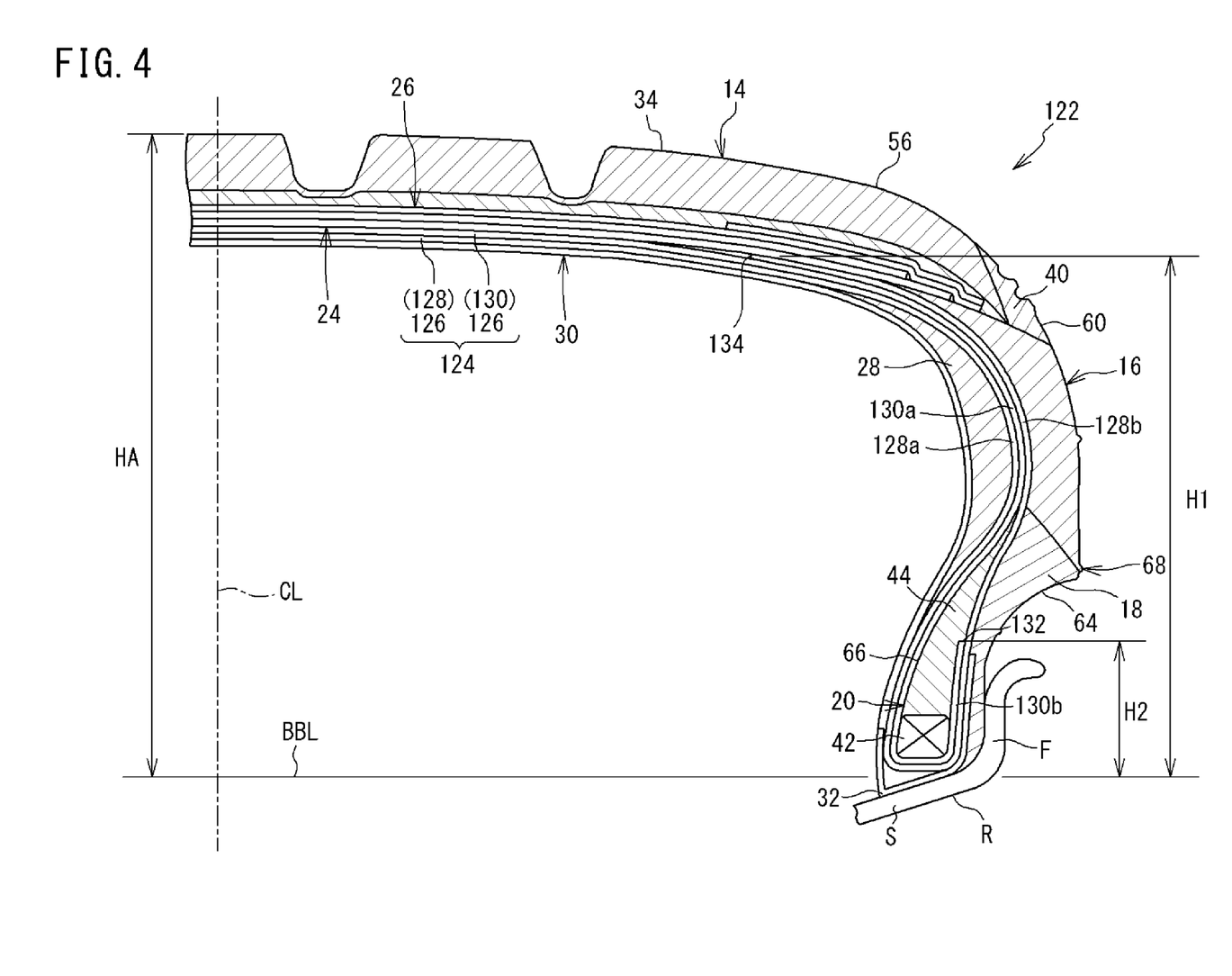
FIG. 4 is a cross-sectional view of a part of a pneumatic tire according to still another embodiment of the present invention.

FIG. 4 shows a part of a pneumatic tire 122 according to still another embodiment of the present invention. FIG. 4 shows a part of a cross-section of the tire 122 along a plane including the rotation axis of the tire 122. In FIG. 4, the right-left direction is the axial direction of the tire 122, and the up-down direction is the radial direction of the tire 122. The direction perpendicular to the surface of the sheet of FIG. 4 is the circumferential direction of the tire 122.

The tire 122 has the same structure as the structure of the tire 12 shown in FIG. 1, except for a carcass 124. Therefore, in FIG. 4, members that are the same as the members of the tire 12 in FIG. 1 are denoted by the same reference characters and the description thereof is omitted.

Also in the tire 122, similar to the tire 12 shown in FIG. 1, the side surface 60 has the flange opposed surface 64 opposed to the flange F of the rim R. The flange opposed surface 64 is formed to be a surface having a diameter increasing outward in the axial direction. In the cross-section of the tire 122 as taken along a plane including the rotation axis of the tire 122, the shape of the flange opposed surface 64 is represented by a circular arc, and the radius of the circular arc is not less than 11.0 mm and not greater than 20.0 mm.

In a state where the tire 122 is mounted on the rim R, the interval between the tire 122 and the flange F of the rim R is sufficiently ensured. In the tire 122, the bead 20 portion is readily bent in its entirety. At the time of passing on a stepped portion, when a portion of the tire 122 from the sidewall 16 to the clinch 18 is greatly deformed by being pressed between the road surface and the flange F of the rim R, tensile force acts on the entirety of the carcass 124. In the conventional tire, there is a possibility that pinch cut may occur in the carcass extending along the inner surface of the bead. In contrast, in the tire 122, stress acting on the carcass 124 is reduced. In the tire 122, occurrence of pinch cut is inhibited.

Further, in the tire 122, the carcass 124 includes two carcass plies 126. Of the two carcass plies 126 of the carcass 124, the carcass ply 126 located on the inner side is a first carcass ply 128, and the carcass ply 126 located on the outer side is a second carcass ply 130.

Similar to the carcass ply 50 of the tire 12 shown in FIG. 1, each carcass ply 126 includes multiple carcass cords aligned with each other, which are not shown. The carcass cords are covered with a topping rubber. Each carcass cord intersects the equator plane CL. In the tire 122, the angle of each carcass cord relative to the equator plane CL is not less than 70° and not greater than 90°. The carcass 124 of the tire 122 has a radial structure. In the tire 122, a cord formed from an organic fiber is used as the carcass cord.

In the tire 122, the first carcass ply 128 is turned up around each core 42. The first carcass ply 128 includes: a first main body portion 128a that extends on and between one core 42 and the other core 42; and a pair of first turned-up portions 128b that are connected to the first main body portion 128a and turned up around the respective cores 42 from the inner side toward the outer side in the axial direction.

In the tire 122, the second carcass ply 130 is turned up around each core 42. The second carcass ply 130 includes: a second main body portion 130a that extends on and between one core 42 and the other core 42; and a pair of second turned-up portions 130b that are connected to the second main body portion 130a and turned up around the respective cores 42 from the inner side toward the outer side in the axial direction. As shown in FIG. 4, in the tire 122, an end 132 of the second turned-up portion 130b is located radially inward of an end 134 of the first turned-up portion 128b. The end 132 of the second turned-up portion 130b is covered with the first turned-up portion 128b from the outer side in the axial direction.

In FIG. 4, a double-headed arrow HA represents the cross-sectional height (see JATMA or the like) of the tire 122. A double-headed arrow H1 represents the distance in the radial direction from the bead base line BBL to the end 134 of the first turned-up portion 128b. A double-headed arrow H2 represents the distance in the radial direction from the bead base line BBL to the end 132 of the second turned-up portion 130b.

In the tire 122, the distance H1 in the radial direction from the bead base line BBL to the end 134 of the first turned-up portion 128b is preferably not less than 40% of the cross-sectional height HA, and preferably not greater than 80% of the cross-sectional height HA. When the distance H1 is set to be not less than 40% of the cross-sectional height HA, the stiffness is appropriately maintained and necessary run-flat durability is ensured. When the distance H1 is set to be not greater than 80% of the cross-sectional height HA, the bead 20 portion is readily bent in its entirety, so that concentration of stress on the carcass 124 extending along the inner surface 66 of the bead 20 is inhibited. In the tire 122, occurrence of pinch cut is inhibited.

In the tire 122, the distance H2 in the radial direction from the bead base line BBL to the end 132 of the second turned-up portion 130b is preferably not less than 20% of the cross-sectional height HA, and preferably not greater than 40% of the cross-sectional height HA. When the distance H2 is set to be not less than 20% of the cross-sectional height HA, the stiffness is appropriately maintained and necessary run-flat durability is ensured. When the distance H2 is set to be not greater than 40% of the cross-sectional height HA, the bead 20 portion is readily bent in its entirety, so that concentration of stress on the carcass 124 extending along the inner surface 66 of the bead 20 is inhibited. In the tire 122, occurrence of pinch cut is inhibited.

As shown in FIG. 4, in the tire 122, the end 134 of the first turned-up portion 128b is located between the second main body portion 130a and the belt 24. That is, in the tire 122, the carcass 124 is formed such that the end 134 of the first turned-up portion 128b is disposed between the second main body portion 130a and the belt 24. In the tire 122, the first turned-up portion 128b, together with the side reinforcing layer 28, inhibits deformation of the tire 122 in a punctured state. The first turned-up portion 128b contributes to support of a load in a punctured state. From this standpoint, in the case where the carcass 124 includes two carcass plies 126, the carcass 124 may be formed such that the end 134 of the first turned-up portion 128b is disposed between the second main body portion 130a and the belt 24, so as to support a load in a punctured state. In the tire 122, in the case where the above-described ratio of the distance H1 in the radial direction relative to the cross-sectional height HA is not less than 80%, the carcass 124 is in such a state that the end 134 of the first turned-up portion 128b is disposed between the second main body portion 130a and the belt 24.

In the tire 122, the clinch 104 of the tire 102 shown in FIG. 3 may be applied to the clinch 18. In the tire 122, while necessary run-flat durability is ensured, occurrence of pinch cut is further effectively inhibited.

As is obvious from the above description, according to the present invention, a pneumatic tire that enables inhibition of occurrence of pinch cut is obtained.

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

The following will describe the present invention in further detail by means of examples, etc., but the present invention is not limited to these examples.
[Experiment 1—Flange Opposed Surface]

Example 1

A pneumatic tire (tire size=245/40RF19) having the basic structure shown in FIG. 1 and having the specifications indicated in Table 1 below was obtained.

In Example 1, the radius R of the circular arc representing the shape of the flange opposed surface was set to 15.0 mm. The distance Lr in the radial direction from the bead base line to the inner end of the flange opposed surface was 15.0 mm. The interval T between the flange opposed surface and the flange of the rim was 4.7 mm.

In Example 1, the number of carcass plies of the carcass, i.e., the number of plies was one. The width (thickness) TS, in the axial direction, of each sidewall at the maximum width position was 3 mm.

Comparative Example 1

A tire of Comparative Example 1 was obtained in the same manner as in Example 1 except that the radius R and the distance Lr were changed to set the interval T as indicated in Table 1 below. The tire of Comparative Example 1 is a conventional tire.

Comparative Example 2

A tire of Comparative Example 2 was obtained in the same manner as in Example 1 except that the radius R and the distance Lr were changed to set the interval T as indicated in Table 1 below, and the number of plies was as indicated in Table 1. The tire of Comparative Example 2 is a conventional tire. In the carcass of Comparative Example 2, the end of the first carcass ply was disposed between the second main body portion of the second carcass ply and the belt. The end of the second carcass ply was covered with the first turned-up portion of the first carcass ply, on the side radially inward of the outer end of the apex.

Comparative Example 3

A tire of Comparative Example 3 was obtained in the same manner as in Example 1 except that the radius R and the distance Lr were changed to set the interval T as indicated in Table 1 below, and the thickness TS was as indicated in Table 1. The tire of Comparative Example 3 is a conventional tire.

Examples 2 to 10

Tires of Examples 2 to 10 were obtained in the same manner as in Example 1 except that the radius R and the distance Lr were changed to set the interval T as indicated in Tables 1 and 2 below.
[Weight]

The weight of each sample tire was measured. The results are indicated as indexes in the cell for "Weight" in Tables 1 and 2 below. The less the value is, the less the weight is.
[Pinch Cut]

Each sample tire was fitted onto a rim (size=8.5 J), and was inflated with air to adjust the internal pressure of the tire to 230 kPa. The tire was mounted to the right front wheel of a test vehicle. On the lateral side, a test road was prepared, and the test road included a steel projection having a rectangular cross-sectional shape with a height of 110 mm, a width of 100 mm, and a length of 1500 mm A valve core was removed so that the inside of the tire communicated with the atmosphere, and thus a punctured state was produced in the tire. The vehicle was caused to progress at an angle of 15° relative to the length direction of the projection, and rode over the projection. The speed at which the vehicle progressed was sequentially increased from 15 km/h at increments of 3 km/h, and the speed when pinch cut occurred was obtained. The results are indicated as indexes in the cell for "Pinch cut" in Tables 1 and 2 below. The greater the value is, the more excellent the pinch cut resistance is and the more effectively occurrence of pinch cut is inhibited.
[Ride Comfort]

Each sample tire was fitted onto a rim (size=8.5 J), and was inflated with air to adjust the internal pressure of the tire to 230 kPa. The tires were mounted to all the wheels of a test vehicle (one person got into the vehicle), and the vehicle was caused to run on a test course having a dry asphalt road surface. The driver made evaluation (sensory evaluation) for ride comfort at that time. The results are indicated as indexes in the cell for "Ride comfort" in Tables 1 and 2 below. The greater the value is, the more excellent the ride comfort is.
[Run-Flat Durability]

Using a drum testing machine, each sample tire underwent run-flat running under the following conditions, and the running distance until abnormal sound was generated from the tire was measured. The results are indicated as indexes in the cell for "RF durability" in Tables 1 and 2 below. The greater the value is, the more excellent the run-flat durability is.

Rim: 8.5 J, Internal pressure: 0 kPa (valve core was removed)
Load: 4.3 kN
Speed: 80 km/h
[Comprehensive Performance]

A difference from Comparative Example 1 serving as a reference was calculated for each evaluation item, and the sum of the calculated differences was obtained. The results are indicated in the cell for "Comprehensive performance" in Tables 1 and 2 below. The greater the value is, the higher the evaluation is. Regarding the weight, the less the value is, the higher the evaluation is. Therefore, the index therefor in each example was subtracted from the index in Comparative Example 1, to calculate the difference from Comparative Example 1. Regarding the pinch cut, the ride comfort, and the run-flat durability, the greater the value is, the higher the evaluation is. Therefore, the index therefor in Comparative Example 1 was subtracted from the index in each example, to calculate the difference from Comparative Example 1.

TABLE 1

| | Comparative Example 1 | Comparative Example 2 | Comparative Example 3 | Example 2 | Example 3 | Example 1 | Example 4 |
|---|---|---|---|---|---|---|---|
| R [mm] | 10.0 | 10.0 | 10.0 | 11.0 | 12.0 | 15.0 | 18.0 |
| Lr [mm] | 10.0 | 10.0 | 10.0 | 15.0 | 15.0 | 15.0 | 15.0 |
| T [mm] | 2.3 | 2.3 | 2.3 | 2.6 | 3.2 | 4.7 | 4.9 |
| Number of plies | 1 | 2 | 1 | 1 | 1 | 1 | 1 |
| TS [mm] | 3 | 3 | 5 | 3 | 3 | 3 | 3 |
| Weight | 100 | 150 | 130 | 99 | 99 | 99 | 98 |
| Pinch cut | 100 | 115 | 120 | 118 | 130 | 140 | 145 |
| Ride comfort | 100 | 70 | 80 | 99 | 99 | 98 | 98 |
| RF durability | 100 | 120 | 102 | 99 | 99 | 98 | 90 |
| Comprehensive performance | — | −45 | −28 | 17 | 29 | 37 | 35 |

TABLE 2

| | Example 5 | Example 6 | Example 7 | Example 8 | Example 9 | Example 10 |
|---|---|---|---|---|---|---|
| R [mm] | 20.0 | 20.0 | 15.0 | 15.0 | 15.0 | 15.0 |
| Lr [mm] | 15.0 | 20.0 | 20.0 | 18.0 | 12.0 | 11.0 |
| T [mm] | 5.3 | 6 | 5.5 | 5.1 | 3.5 | 2.8 |
| Number of plies | 1 | 1 | 1 | 1 | 1 | 1 |
| TS [mm] | 3 | 3 | 3 | 3 | 3 | 3 |
| Weight | 97 | 97 | 97 | 98 | 99 | 99 |
| Pinch cut | 145 | 150 | 145 | 145 | 130 | 120 |
| Ride comfort | 96 | 95 | 96 | 98 | 99 | 99 |
| RF durability | 80 | 70 | 80 | 90 | 99 | 99 |
| Comprehensive performance | 24 | 18 | 24 | 35 | 29 | 19 |

As indicated in Table 1 and Table 2, the examples are highly rated, as compared to the comparative examples. In particular, in the examples, occurrence of pinch cut is inhibited, and well-balanced properties are obtained in terms of the weight, the ride comfort, and the run-flat durability. From the evaluation results, advantages of the present invention are clear.

[Experiment 2—Apex]

Example 11

A pneumatic tire (tire size=245/40RF19) having the basic structure shown in FIG. 1 and having the specifications indicated in Table 3 below was obtained.

In Example 11, the width B1 of the contact surface of each apex with the core was 9.0 mm. The width B2 of the apex at a position distant from the bead base line by 17.5 mm in the radially outward direction was 5.5 mm.

In Example 11, the radius R of the circular arc representing the shape of the flange opposed surface was set to 15.0 mm. The distance Lr in the radial direction from the bead base line to the inner end of the flange opposed surface was 15.0 mm. The interval T between the flange opposed surface and the flange of the rim was 4.7 mm. The number of carcass plies of the carcass, i.e., the number of plies was one. The width (thickness) TS, in the axial direction, of each sidewall at the maximum width position was 3 mm.

Comparative Example 4

A tire of Comparative Example 4 was obtained in the same manner as in Example 11 except that the radius R and the distance Lr were changed to set the interval T as indicated in Table 3 below. The tire of Comparative Example 4 is a conventional tire.

Examples 12 to 15

Tires of Examples 12 to 15 were each obtained in the same manner as in Example 11 except that the width B2 was as indicated in Table 3 below.

Examples 16 to 21

Tires of Examples 16 to 21 were each obtained in the same manner as in Example 11 except that the width B1 and the width B2 were as indicated in Table 4 below.

[Weight]

The weight of each sample tire was measured. The results are indicated as indexes in the cell for "Weight" in Tables 3 and 4 below. The less the value is, the less the weight is.

[Pinch Cut]

Indexes regarding pinch cut properties were obtained in the same manner as in Experiment 1 described above. The results are indicated in the cell for "Pinch cut" in Tables 3 and 4 below. The greater the value is, the more excellent the pinch cut resistance is and the more effectively occurrence of pinch cut is inhibited.

[Run-Flat Durability]

Indexes regarding run-flat durability were obtained in the same manner as in Experiment 1 described above. The results are indicated in the cell for "RF durability" in Tables 3 and 4 below. The greater the value is, the more excellent the run-flat durability is.

[Comprehensive Performance]

A difference from Comparative Example 4 serving as a reference was calculated for each evaluation item, and the sum of the calculated differences was obtained. The results are indicated in the cell for "Comprehensive performance" in Tables 3 and 4 below. The greater the value is, the higher the evaluation is. Regarding the weight, the less the value is, the higher the evaluation is. Therefore, the index therefor in each example was subtracted from the index in Comparative Example 4, to calculate the difference from Comparative Example 4. Regarding the pinch cut and the run-flat durability, the greater the value is, the higher the evaluation is. Therefore, the index therefor in Comparative Example 4 was subtracted from the index in each example, to calculate the difference from Comparative Example 4.

base line to the inner end of the flange opposed surface was 15.0 mm. The interval T between the flange opposed surface and the flange of the rim was 4.7 mm. The number of carcass plies of the carcass, i.e., the number of plies was one. The width (thickness) TS, in the axial direction, of each sidewall at the maximum width position was 3 mm.

TABLE 3

|  | Comparative Example 4 | Example 12 | Example 13 | Example 11 | Example 14 | Example 15 |
|---|---|---|---|---|---|---|
| R [mm] | 10.0 | 15.0 | 15.0 | 15.0 | 15.0 | 15.0 |
| Lr [mm] | 10.0 | 15.0 | 15.0 | 15.0 | 15.0 | 15.0 |
| T [mm] | 2.3 | 4.7 | 4.7 | 4.7 | 4.7 | 4.7 |
| Number of plies | 1 | 1 | 1 | 1 | 1 | 1 |
| TS [mm] | 3 | 3 | 3 | 3 | 3 | 3 |
| B1 [mm] | 9.0 | 9.0 | 9.0 | 9.0 | 9.0 | 9.0 |
| B2 [mm] | 5.5 | 3.5 | 4.5 | 5.5 | 6.0 | 6.5 |
| Weight | 100 | 89 | 89 | 99 | 105 | 110 |
| Pinch cut | 100 | 145 | 140 | 130 | 115 | 105 |
| RF durability | 100 | 60 | 85 | 98 | 110 | 115 |
| Comprehensive performance | — | 16 | 36 | 29 | 20 | 10 |

TABLE 4

|  | Example 16 | Example 17 | Example 18 | Example 19 | Example 20 | Example 21 |
|---|---|---|---|---|---|---|
| R [mm] | 15.0 | 15.0 | 15.0 | 15.0 | 15.0 | 15.0 |
| Lr [mm] | 15.0 | 15.0 | 15.0 | 15.0 | 15.0 | 15.0 |
| T [mm] | 4.7 | 4.7 | 4.7 | 4.7 | 4.7 | 4.7 |
| Number of plies | 1 | 1 | 1 | 1 | 1 | 1 |
| TS [mm] | 3 | 3 | 3 | 3 | 3 | 3 |
| B1 [mm] | 6.0 | 7.0 | 7.0 | 7.0 | 7.0 | 7.0 |
| B2 [mm] | 4.5 | 3.5 | 4.5 | 5.5 | 6.0 | 6.5 |
| Weight | 79 | 79 | 84 | 89 | 99 | 104 |
| Pinch cut | 150 | 150 | 145 | 140 | 130 | 115 |
| RF durability | 45 | 45 | 80 | 85 | 90 | 95 |
| Comprehensive performance | 16 | 16 | 41 | 36 | 21 | 6 |

As indicated in Table 3 and Table 4, the examples are highly rated, as compared to the comparative example. In particular, in the examples, occurrence of pinch cut is inhibited, and well-balanced properties are obtained in terms of the weight and the run-flat durability. From the evaluation results, advantages of the present invention are clear.

[Experiment 3—Clinch]

Example 22

A pneumatic tire (tire size=245/40RF19) having the basic structure shown in FIG. 3 and having the specifications indicated in Table 5 below was obtained.

In Example 22, the complex elastic modulus E*u of each inner clinch was 60 MPa. The complex elastic modulus E*s of each outer clinch was 30 MPa. The ratio (E*s/E*u) of the complex elastic modulus E*s of the outer clinch relative to the complex elastic modulus E*u of the inner clinch was 0.50. The distance Hb in the radial direction from the bead base line to the radially outer end PC of the inner clinch was 12 mm. The tilt angle α of the boundary between the inner clinch and the outer clinch was 30°.

In Example 22, the radius R of the circular arc representing the shape of the flange opposed surface was set to 15.0 mm. The distance Lr in the radial direction from the bead Comparative Example 5

A tire of Comparative Example 5 was obtained in the same manner as in Example 22 except that the radius R and the distance Lr were changed to set the interval T as indicated in Table 5 below, and each clinch was formed of a single rubber composition. The tire of Comparative Example 5 is a conventional tire. In Comparative Example 5, the complex elastic modulus E*c of the clinch was 60 MPa.

Example 23

A tire of Example 23 was obtained in the same manner as in Example 22 except that the tilt angle α was as indicated in Table 5 below.

Example 24

A tire of Example 24 was obtained in the same manner as in Example 22 except that the distance Hb and the tilt angle α were as indicated in Table 5 below.

Example 25

A tire of Example 25 was obtained in the same manner as in Example 22 except that the radius R and the distance Lr were changed to set the interval T as indicated in Table 5 below.

Example 26

A tire of Example 26 was obtained in the same manner as in Example 22 except that the complex elastic modulus E*s was changed to set the ratio (E*s/E*u) as indicated in Table 5 below, and the distance Hb and the tilt angle α were as indicated in Table 5 below.

Example 27

A tire of Example 27 was obtained in the same manner as in Example 22 except that the distance Hb and the tilt angle α were as indicated in Table 5 below.

Examples 28 to 33

Tires of Examples 28 to 33 were obtained in the same manner as in Example 22 except that the complex elastic modulus E*s was changed to set the ratio (E*s/E*u) as indicated in Table 6 below, and the tilt angle α was as indicated in Table 6 below.

[Weight]

The weight of each sample tire was measured. The results are indicated as indexes in the cell for "Weight" in Tables 5 and 6 below. The less the value is, the less the weight is.

[Pinch Cut]

Indexes regarding pinch cut properties were obtained in the same manner as in Experiment 1 described above. The results are indicated in the cell for "Pinch cut" in Tables 5 and 6 below. The greater the value is, the more excellent the pinch cut resistance is and the more effectively occurrence of pinch cut is inhibited.

[Ride Comfort]

Indexes regarding ride comfort were obtained in the same manner as in Experiment 1 described above. The results are indicated as indexes in the cell for "Ride comfort" in Tables 5 and 6 below. The greater the value is, the more excellent the ride comfort is.

[Run-Flat Durability]

Indexes regarding run-flat durability were obtained in the same manner as in Experiment 1 described above. The results are indicated in the cell for "RF durability" in Tables 5 and 6 below. The greater the value is, the more excellent the run-flat durability is.

[Comprehensive Performance]

A difference from Comparative Example 5 serving as a reference was calculated for each evaluation item, and the sum of the calculated differences was obtained. The results are indicated in the cell for "Comprehensive performance" in Tables 5 and 6 below. The greater the value is, the higher the evaluation is. Regarding the weight, the less the value is, the higher the evaluation is. Therefore, the index therefor in each example was subtracted from the index in Comparative Example 5, to calculate the difference from Comparative Example 5. Regarding the pinch cut, ride comfort, and the run-flat durability, the greater the value is, the higher the evaluation is. Therefore, the index therefor in Comparative Example 5 was subtracted from the index in each example, to calculate the difference from Comparative Example 5.

TABLE 5

|  | Comparative Example 5 | Example 23 | Example 24 | Example 22 | Example 25 | Example 26 | Example 27 |
|---|---|---|---|---|---|---|---|
| R [mm] | 10.0 | 15.0 | 15.0 | 15.0 | 11.0 | 15.0 | 15.0 |
| Lr [mm] | 10.0 | 15.0 | 15.0 | 15.0 | 11.0 | 15.0 | 15.0 |
| T [mm] | 2.3 | 4.7 | 4.7 | 4.7 | 2.3 | 4.7 | 4.7 |
| Hb [mm] | — | 12 | 15 | 12 | 12 | 5 | 20 |
| E*u [MPa] | 60 | 60 | 60 | 60 | 60 | 60 | 60 |
| E*s [MPa] | 60 | 30 | 30 | 30 | 30 | 50 | 30 |
| E*s/E*u [—] | 1 | 0.50 | 0.50 | 0.50 | 0.50 | 0.83 | 0.50 |
| Angle α [°] | — | 0 | 0 | 30 | 30 | 0 | 0 |
| Number of plies | 1 | 1 | 1 | 1 | 1 | 1 | 1 |
| TS [mm] | 3 | 3 | 3 | 3 | 3 | 3 | 3 |
| Weight | 100 | 99 | 99 | 99 | 100 | 99 | 99 |
| Pinch cut | 100 | 150 | 145 | 155 | 120 | 150 | 125 |
| Ride comfort | 100 | 97 | 98 | 99 | 99 | 88 | 99 |
| RF durability | 100 | 95 | 97 | 93 | 98 | 85 | 99 |
| Comprehensive performance | — | 43 | 41 | 48 | 17 | 24 | 24 |

TABLE 6

|  | Example 28 | Example 29 | Example 30 | Example 31 | Example 32 | Example 33 |
|---|---|---|---|---|---|---|
| R [mm] | 15.0 | 15.0 | 15.0 | 15.0 | 15.0 | 15.0 |
| Lr [mm] | 15.0 | 15.0 | 15.0 | 15.0 | 15.0 | 15.0 |
| T [mm] | 4.7 | 4.7 | 4.7 | 4.7 | 4.7 | 4.7 |
| Hb [mm] | 15 | 12 | 12 | 12 | 12 | 15 |
| E*u [MPa] | 60 | 60 | 60 | 60 | 60 | 60 |

TABLE 6-continued

|  | Example 28 | Example 29 | Example 30 | Example 31 | Example 32 | Example 33 |
|---|---|---|---|---|---|---|
| E*s [MPa] | 20 | 50 | 55 | 50 | 50 | 50 |
| E*s/E*u [—] | 0.33 | 0.83 | 0.92 | 0.83 | 0.83 | 0.83 |
| Angle α [°] | 0 | 0 | 0 | 40 | 30 | −10 |
| Number of plies | 1 | 1 | 1 | 1 | 1 | 1 |
| TS [mm] | 3 | 3 | 3 | 3 | 3 | 3 |
| Weight | 99 | 99 | 99 | 99 | 99 | 99 |
| Pinch cut | 145 | 140 | 125 | 150 | 145 | 120 |
| Ride comfort | 90 | 99 | 99 | 99 | 99 | 95 |
| RF durability | 90 | 98 | 99 | 80 | 98 | 98 |
| Comprehensive performance | 26 | 38 | 24 | 30 | 43 | 14 |

As indicated in Table 5 and Table 6, the examples are highly rated, as compared to the comparative example. In particular, in the examples, occurrence of pinch cut is inhibited, and well-balanced properties are obtained in terms of the weight, the ride comfort, and the run-flat durability. From the evaluation results, advantages of the present invention are clear.

The above-described technology for inhibiting occurrence of pinch cut can also be applied to various tires.

What is claimed is:

1. A pneumatic tire comprising:
a pair of beads each including a core extending in a circumferential direction;
a carcass extending on and between one of the bead cores and the other of the bead cores;
a pair of run flat side reinforcing layers each located axially inward of the carcass;
a tread having a tread surface configured to be in contact with a road surface;
a pair of sidewalls extending radially inward from ends of the tread along the carcass, on an axially outer side of the carcass; and
a pair of clinches one located radially inward of each of the sidewalls, wherein when the tire is in its normal state,
the tire has seat contact surfaces each of which is configured to be in contact with a seat of a rim on which the tire is to be mounted, and side surfaces extending on and between the tread surface and the seat contact surfaces,
each side surface includes a flange contact surface which is in contact with a flange of the normal rim, and a flange opposed surface which abuts the flange contact surface, is located radially outward of the flange contact surface, and is the entire surface opposed to the flange,
the flange opposed surface has a diameter increasing outward in an axial direction along the entire axial extent of the flange opposed surface,
the shape of the flange opposed surface is a circular arc in every cross-section of the tire as taken along a plane including a rotation axis of the tire,
a radius of the circular arc is not less than 12.0 mm and not greater than 18.0 mm,
a radial distance from the bead base line to a radially inner end of the flange opposed surface is not less than 12.0 mm and not greater than 18.0 mm,
each clinch forms the flange contact surface and the flange opposed surface,
a complex elastic modulus of each clinch is not less than 30 MPa and not greater than 60 MPa.

2. The pneumatic tire according to claim 1, wherein
each bead includes an apex located radially outward of the core,
in the cross-section of the tire, a width of a contact surface of the apex with the core is not less than 7.0 mm and not greater than 9.0 mm,
a width of the apex at a position distant from the bead base line by 17.5 mm in a radially outward direction is not less than 4.5 mm and not greater than 6.0 mm,
a complex elastic modulus of the apex is not less than 50 MPa and not greater than 100 MPa, and
a complex elastic modulus of each run flat side reinforcing layer is not less than 9 MPa and not greater than 14 MPa.

3. The pneumatic tire according to claim 1, wherein
when the tire is in its normal state, an interval between the flange opposed surface and the flange is not less than 2.6 mm and not greater than 6.0 mm, the interval being measured along a line that is normal to the flange opposed surface and passes through a position, on the flange, equal to 90% of a distance in a radial direction from the bead base line to a radially outer end of the flange of the rim.

4. The pneumatic tire according to claim 3, wherein
the interval between the flange opposed surface and the flange is not less than 3.2 mm and not greater than 5.1 mm.

5. The pneumatic tire according to claim 1, the tire being in its normal state and further comprising a pair of rim guards which are located radially outward of the rim and project outward in the axial direction, one forming part of each respective side surface, wherein
each rim guard has a shape expanding from a top portion thereof so as to be tapered in the cross-section of the tire,
the surface, on the bead side, of each rim guard forms the respective flange opposed surface, and
the shape of the surface, on the tread side, of each rim guard is a circular arc having its center on an outer side of the respective side surface.

6. The pneumatic tire according to claim 5, wherein
when the tire is in its normal state, an interval between the flange opposed surface and the flange is not less than 2.6 mm and not greater than 6.0 mm, the interval being measured along a line that is normal to the flange opposed surface and passes through a position, on the flange, equal to 90% of a distance in a radial direction from the bead base line to a radially outer end of the flange of the rim.

7. The pneumatic tire according to claim 5, wherein
each rim guard is formed by a part of a respective one of the sidewalls and a part of a respective one of the clinches.

8. The pneumatic tire according to claim 5, wherein
the carcass includes a first carcass ply and a second carcass ply,
each of the first carcass ply and the second carcass ply is turned up around each core from an inner side toward an outer side in the axial direction,
ends of the second carcass ply are located radially inward of ends of the first carcass ply, and
when the tire is in its normal state, a distance in a radial direction from the bead base line to each end of the first carcass ply is not less than 40% of a tire cross-sectional height and not greater than 80% of the tire cross-sectional height.

9. A pneumatic tire comprising:
a pair of beads each including a core extending in a circumferential direction;
a carcass extending on and between one of the bead cores and the other of the bead cores; and
a pair of run flat side reinforcing layers each located axially inward of the carcass, wherein when the tire is in its normal state,
the tire has a tread surface configured to be in contact with a road surface, seat contact surfaces each of which is configured to be in contact with a seat of a rim on which the tire is to be mounted, and side surfaces extending on and between the tread surface and the seat contact surfaces,
each side surface includes a flange contact surface which is in contact with a flange of the normal rim, and a flange opposed surface which abuts the flange contact surface, is located radially outward of the flange contact surface, and is the entire surface opposed to the flange,
the flange opposed surface has a diameter increasing outward in an axial direction along the entire axial extent of the flange opposed surface,
the shape of the flange opposed surface is a circular arc in every cross-section of the tire as taken along a plane including a rotation axis of the tire,
a radius of the circular arc is not less than 11.0 mm and not greater than 18.0 mm, and
an interval between the flange opposed surface and the flange is not less than 2.6 mm and not greater than 6.0 mm, the interval being measured along a line that is normal to the flange opposed surface and passes through a position, on the flange, equal to 90% of a distance in a radial direction from the bead base line to a radially outer end of the flange of the rim.

10. The pneumatic tire according to claim 9, wherein when the tire is in its normal state,
the radius of the circular arc is not less than 12.0 mm and not greater than 18.0 mm, and
a radial distance in a radial direction from the bead base line to a radially inner end of the flange opposed surface is not less than 12.0 mm and not greater than 18.0 mm.

11. The pneumatic tire according to claim 9, the tire being in its normal state and further comprising a pair of rim guards which are located radially outward of the rim and project outward in the axial direction, one forming part of each respective side surface, wherein
each rim guard has a shape expanding from a top portion thereof so as to be tapered in the cross-section of the tire,
the surface, on the bead side, of each rim guard forms the respective flange opposed surface, and
the shape of the surface, on the tread side, of each rim guard is a circular arc having its center on an outside of the respective side surface.

12. The pneumatic tire according to claim 11, further comprising:
a tread having the tread surface;
a pair of sidewalls extending radially inward from ends of the tread along the carcass, on an axially outer side of the carcass; and
a pair of clinches one located radially inward of each of the sidewalls, wherein
each rim guard is formed by a part of a respective corresponding one of the sidewalls and a part of a respective one of the clinches,
on each side surface, the flange contact surface and the flange opposed surface are formed by the clinch, and
a complex elastic modulus of each clinch is not less than 30 MPa and not greater than 60 MPa.

* * * * *